US012646677B2

(12) United States Patent
Saito

(10) Patent No.: US 12,646,677 B2
(45) Date of Patent: Jun. 2, 2026

(54) X-RAY TUBE

(71) Applicant: CANON ELECTRON TUBES & DEVICES CO., LTD., Otawara (JP)

(72) Inventor: Tomonobu Saito, Yaita (JP)

(73) Assignee: CANON ELECTRON TUBES & DEVICES CO., LTD., Otawara (JP)

( * ) Notice: Subject to any disclaimer, the term of this patent is extended or adjusted under 35 U.S.C. 154(b) by 159 days.

(21) Appl. No.: 18/739,618

(22) Filed: Jun. 11, 2024

(65) Prior Publication Data

US 2024/0331966 A1 Oct. 3, 2024

Related U.S. Application Data

(63) Continuation of application No. PCT/JP2022/021131, filed on May 23, 2022.

(30) Foreign Application Priority Data

Dec. 16, 2021 (JP) ................................. 2021-204336

(51) Int. Cl.
*H01J 35/18* (2006.01)

(52) U.S. Cl.
CPC .................................... *H01J 35/18* (2013.01)

(58) Field of Classification Search
None
See application file for complete search history.

(56) References Cited

U.S. PATENT DOCUMENTS

| | | | | |
|---|---|---|---|---|
| 6,487,272 B1 * | 11/2002 | Kutsuzawa | H01J 35/186 | 378/129 |
| 2007/0291901 A1 * | 12/2007 | Warburton | H01J 9/26 | 378/140 |
| 2015/0162163 A1 * | 6/2015 | Anno | H01J 9/24 | 378/123 |
| 2019/0279836 A1 | 9/2019 | Takahashi | | |

FOREIGN PATENT DOCUMENTS

| | | |
|---|---|---|
| DE | 196 38 150 A1 | 4/1998 |
| EP | 1 220 423 A | 1/1971 |
| JP | 62-121773 U | 8/1987 |
| JP | 4-98254 U | 8/1992 |
| JP | 2010-211939 A | 9/2010 |
| JP | 2016-33862 A | 3/2016 |
| JP | 2019-160430 A | 9/2019 |

OTHER PUBLICATIONS

International Search Report issued Jun. 28, 2022 in PCT/JP2022/021131 filed on May 23, 2022, 2 pages.
Office Action issued Dec. 16, 2025, in corresponding European Patent Application No. 22906891.1, citing documents 1 and 2 therein, 9 pages.

* cited by examiner

*Primary Examiner* — Marcus H Taningco
(74) *Attorney, Agent, or Firm* — Oblon, McClelland, Maier & Neustadt, L.L.P.

(57) ABSTRACT

According to one embodiment, an X-ray tube includes a cathode, an anode, a cathode hood, a first X-ray transmission window, an envelope, and a first restraining member. A second side surface of the first restraining member has a contact surface that is pressed against an inner wall surface in a first hole of the cathode hood. The first X-ray transmission window is maintained in a state of being restrained to an overlap space of a first bottom surface in the first hole by the first restraining member.

4 Claims, 9 Drawing Sheets

X-RAY TUBE

CROSS-REFERENCE TO RELATED APPLICATIONS

This application is a Continuation Application of PCT Application No. PCT/JP2022/021131, filed May 23, 2022 and based upon and claiming the benefit of priority from Japanese Patent Application No. 2021-204336, filed Dec. 16, 2021, the entire contents of all of which are incorporated herein by reference.

FIELD

Embodiments described herein relate generally to an X-ray tube.

BACKGROUND

Stationary anode X-ray tubes are known as X-ray sources that are mounted on non-destructive inspection equipment and continuously generate X-rays for long periods of time. This stationary anode X-ray tube comprises an anode target that generates X-rays by electron impact, a cathode with an electron emission source that emits electrons toward the anode target, and an envelope that maintains a predetermined vacuum around at least the anode target and the electron emission source.

The envelope comprises a glass container to maintain high-voltage insulation of the X-ray tube. The glass container has an opening, and the opening is vacuum-tightly closed by an X-ray transmission assembly. The X-ray transmission assembly includes a window frame that faces the opening and is vacuum-tightly attached to the envelope, and an X-ray transmission window that is housed in the window frame, is made of an X-ray transparent metal such as beryllium, and transmits X-rays.

Electrons emitted from the electron emission source are accelerated by a voltage (X-ray tube voltage) applied between the anode target and the cathode and collide a focal spot on a target surface of the anode target. The electrons colliding the anode target are converted into heat and X-rays on the anode target, and some of the generated X-rays pass through the X-ray transmission window and are output.

Some of the electrons colliding the anode target are not converted into heat or X-rays, but are scattered as recoil electrons. For example, the recoil electrons may collide with the envelope and cause the envelope to become electrically charged, which may cause problems in the X-ray tube, such as occurrence of undesired electrical discharge inside the X-ray tube. Therefore, X-ray tubes equipped with a cathode hood are known to capture the recoil electrons that head toward the enclosure. The cathode hood has an opening, and X-rays generated in the anode target pass through the opening in the cathode hood, are transmitted through the X-ray transmission window in the X-ray transmission assembly, and are emitted outside the X-ray tube.

Note that, in a case of focusing on the capture of recoil electrons, it is desirable for the X-ray tube to have a structure that can capture recoil electrons at a position close to the target surface of the anode target. Therefore, in some cases, the X-ray tube may have a hood structure installed on the anode target side instead of the cathode hood. However, the hood structure is susceptible to adverse thermal effects from the anode target and is easily damaged. In a case of focusing on thermal effects, it is desirable for the X-ray tube to have the cathode hood installed on the cathode side, where the thermal load is smaller than that of the anode target.

DETAILED DESCRIPTION

Figure 1:
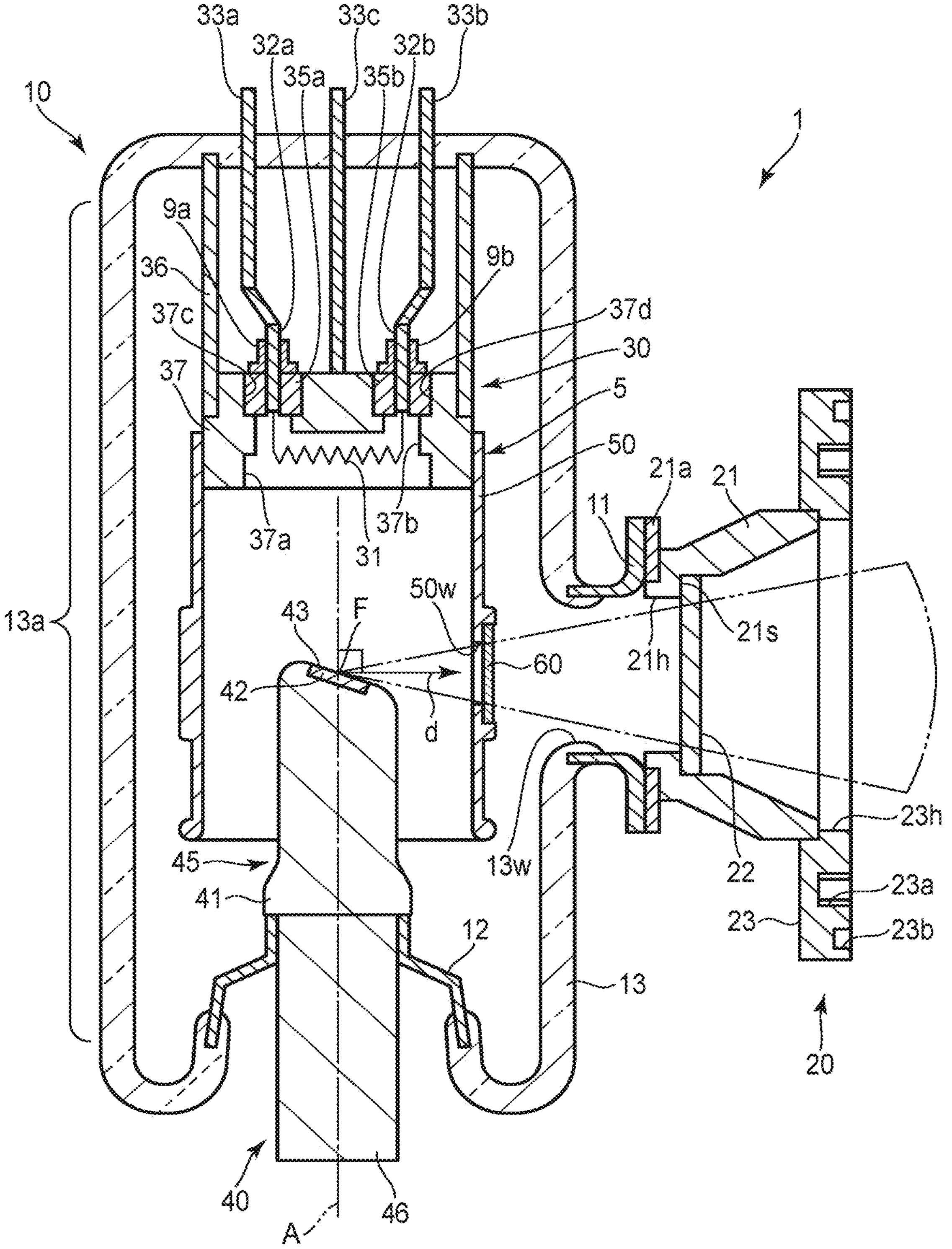
FIG. 1 is a cross-sectional view showing an X-ray tube according to one embodiment.

In general, according to one embodiment, there is provided an X-ray tube comprising: a cathode having an electron emission source that emits electrons; an anode having an anode target facing the cathode in a direction along an X-ray tube axis, and in which a focal spot is formed where electrons emitted from the electron emission source collide to emit X-rays; a cathode hood enclosing an orbit of electrons from the electron emission source to the focal spot and the anode target, and on which a first opening through which X-rays pass is formed; a first X-ray transmission window blocking at least a part of the first opening and having an X-ray transmittance higher than an X-ray transmittance of the cathode hood; and an envelope housing the cathode, the anode target, the cathode hood, and the first X-ray transmission window.

EMBODIMENT

An embodiment of the present invention will be described below with reference to the accompanying drawings. The disclosure is merely an example, and proper changes within the spirit of the inventions, which are easily conceivable by a skilled person, are included in the scope of the inventions as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the inventions. Besides, in the specification and drawings, the same or similar elements as or to those described in connection with preceding drawings are denoted by like reference numerals, and a detailed description thereof is omitted unless otherwise necessary.

FIG. 1 is a cross-sectional view showing an X-ray tube 1 according to the present embodiment. As shown in FIG. 1, the X-ray tube 1 is a stationary anode X-ray tube. The X-ray tube 1 comprises an envelope 10, an X-ray transmission assembly 20, a cathode 30, an anode 40, and a cathode hood assembly 5.

The envelope 10 is formed of glass and metal. In the present embodiment, the envelope 10 is formed of a first metal container 11, a second metal container 12, and a glass container 13. The glass container 13 is formed utilizing, for example, borosilicate glass. The glass container 13 can be formed, for example, by air-tightly joining a plurality of glass members by welding. The glass container 13 is formed in a cylindrical shape with one end closed. The glass container 13 has a cylindrical portion 13*a*. The cylindrical portion 13*a* encloses the cathode hood assembly 5, etc. The cylindrical portion 13*a* (glass container 13) has an opening 13*w* as a second opening. In the present embodiment, the opening 13*w* is circular. The opening 13*w* is located near a target surface 43, which will be described later. By forming the opening 13*w*, attenuation of X-rays by the glass container 13 can be prevented.

The first metal container 11 is located outside the glass container 13 and is provided in a manner surrounding the opening 13*w*. The first metal container 11 is formed in an annular shape utilizing, for example, Kovar (KOV). The first metal container 11 is vacuum-tightly connected to the glass container 13 by fusion welding. The first metal container 11 has a ring formed thereon for coupling with the X-ray transmission assembly 20. In the present embodiment, the first metal container 11 (the ring) is formed in the shape of a circular frame.

The second metal container 12 is vacuum-tightly connected to the other end of the glass container 13 and the anode 40. The second metal container 12 is formed in an annular shape utilizing, for example, KOV. The second metal container 12 is vacuum-tightly connected to the glass container 13 by fusion welding.

The envelope 10 houses the cathode 30, the anode 40, and the cathode hood assembly 5, etc., with a part of the anode 40 being exposed.

The X-ray transmission assembly 20 is attached to the first metal container 11 (envelope 10) and vacuum-tightly closes the opening 13*w*. As a result, the envelope 10 is vacuum-tightly sealed. The vacuum inside the enclosure 10 is maintained.

The X-ray transmission assembly 20 includes a window frame 21, a window frame ring 21*a*, an X-ray transmission window 22 as a second X-ray transmission window, and a ring 23.

The window frame 21 encloses the opening 13*w*. The window frame 21 has the window frame ring 21*a* vacuum-tightly attached thereto for coupling with the first metal container 11. In the present embodiment, the window frame 21 is formed in the shape of a conical frame. The window frame 21 is vacuum-tightly attached to the first metal container 11 (envelope 10). The window frame 21 is formed of copper, for example, as a metal. The window frame 21 is electrically insulated from at least one of the cathode 30 and the anode 40. In the present embodiment, the window frame 21 is electrically insulated from both the cathode 30 and the anode 40. The window frame 21 is designed to have sufficient voltage withstand characteristics for high voltages between the cathode 30 and the anode 40.

The window frame ring 21*a* is formed of iron, for example, as a metal. In the present embodiment, the window frame 21 and the window frame ring 21*a* are fixed by brazing. In the present embodiment, the window frame 21 is vacuum-tightly attached to the envelope 10 by welding the window frame ring 21*a* to the ring of the first metal container 11.

The window frame 21 includes a through-hole 21*h* and a mounting surface 21*s*. In the present embodiment, the through-hole 21*h* is circular, and the mounting surface 21*s* is in a shape of a circular frame. The mounting surface 21*s* is flat. By forming the through-hole 21*h*, attenuation or shielding of X-rays by the window frame 21 can be prevented. The mounting surface 21*s* is formed outside the through-hole 21*h* and forms a part of the envelope 10.

The X-ray transmission window 22 transmits X-rays and configures a part of the envelope 10. The X-ray transmission window 22 can be formed utilizing a material that exhibits X-ray transparency and high mechanical strength. The X-ray transmission window 22 has a higher X-ray transmittance than the X-ray transmittance of the window frame 21. In the present embodiment, the X-ray transmission window 22 is formed of a Be plate (beryllium thin plate: a thin plate utilizing beryllium).

The X-ray transmission window 22 is formed of a flat plate. In the present embodiment, the X-ray transmission window 22 is formed in the shape of a disc. The X-ray transmission window 22 has a mounting area facing the mounting surface 21*s* and attached to the window frame 21, and an X-ray transmitting area facing the through-hole 21*h*.

The mounting area of the X-ray transmission window 22 is vacuum-tightly attached to the mounting surface 21*s*. For example, the X-ray transmission window 22 is attached to the window frame 21 by being brazed to the mounting surface 21*s* utilizing a brazing material not shown. This allows the X-ray transmission window 22 to be housed in the window frame 21 and to vacuum-tightly close the opening 13*w* of the envelope 10 together with the window frame 21. The window frame 21 is located between the opening 13*w* and the ring 23. The ring 23 is located on the opposite side of the first metal container 11 with respect to the window frame 21 and is attached to the window frame 21. In the present embodiment, the ring 23 is formed in the shape of a circular frame. The ring 23 is formed of stainless steel, for example, as a metal. By brazing the ring 23 to the window frame 21, the ring 23 is fixed to the window frame 21.

The ring 23 has a through-hole 23*h*. In the present embodiment, the through-hole 23*h* is circular. By forming the through-hole 23*h*, attenuation and shielding of X-rays by the ring 23 can be prevented. In view of the above, the first metal container 11, the glass container 13, the window frame 21, and the ring 23 are not present on the output path of the X-rays transmitted through the X-ray transmission window 22.

The ring 23 has a screw hole 23*a* and an annular housing groove 23*b*. For example, when housing the X-ray tube 1 inside a housing (not shown) and fixing the X-ray tube 1 to the housing, the X-ray tube 1 can be screwed to the housing utilizing the screw hole 23*a*. By housing an O-ring (not shown) in the housing groove 23*b*, the O-ring can seal a gap between the ring 23 and the housing. For example, in a case where a cooling liquid is present in the space between the housing and the X-ray tube 1, the O-ring can suppress leakage of the cooling liquid. Other locations where the cooling liquid may leak should be sealed as appropriate. For example, the window frame 21 is further attached to the first metal container 11 in a liquid-tight manner, and the ring 23 is further attached to the window frame 21 in a liquid-tight manner.

The cathode 30 is housed in the envelope 10. The cathode 30 is arranged spaced apart from the anode 40 in a direction along an X-ray tube axis A. The cathode 30 has a filament 31 as an electron emission source, filament terminals 32*a* and 32*b*, cathode pins 33*a*, 33*b*, and 33*c*, insulating members 35*a* and 35*b*, a supporting member 36, and a focusing electrode 37.

The filament 31 emits electrons that irradiate the anode 40. In the present embodiment, the filament 31 has a filament coil. The filament terminal 32*a* supports one extension of the filament 31 and is electrically connected to the filament 31. The filament terminal 32*b* supports the other extension of the filament 31 and is electrically connected to the filament 31.

The cathode pins 33*a*, 33*b*, and 33*c* are conductive. In the present embodiment, the cathode pins 33*a*, 33*b*, and 33*c* are made of metal and formed into rod shapes. The cathode pins 33*a*, 33*b*, and 33*c* are attached to the glass container 13. The cathode pins 33*a*, 33*b*, and 33*c* are vacuum-tightly connected to the glass container 13 by fusion welding. The cathode pins 33*a*, 33*b*, and 33*c* each have one end located outside of the envelope 10. The cathode pin 33*a* is electrically connected to the filament terminal 32*a*, the cathode pin 33*b* is electrically connected to the filament terminal 32*b*, and the cathode pin 33*c* is electrically connected to the focusing electrode 37.

The focusing electrode 37 is formed in a columnar shape. The focusing electrode 37 has a focusing groove 37*a* and a housing groove 37*b*. The focusing groove 37*a* is open on the anode 40 side and functions to focus electrons. The housing groove 37*b* is formed on a bottom surface of the focusing groove 37*a*, opens to the anode 40 side, and houses the filament 31.

The focusing electrode 37 also has a through-hole 37*c* for passing the filament terminal 32*a* and a through-hole 37*d* for passing the other extension of the filament 31 and the filament terminal 32*b*.

The insulating member 35*a* is provided in the through-hole 37*c* and fixed to the focusing electrode 37. The insulating member 35*a* is formed in a cylindrical shape and the filament terminal 32*a* is inserted therein. The filament terminal 32*a* is in contact with a connecting component (sleeve) 9*a* fixed to the insulating member 35*a*.

The insulating member 35*b* is provided in the through-hole 37*d* and fixed to the focusing electrode 37. The insulating member 35*b* is formed in a cylindrical shape and the filament terminal 32*b* is inserted therein. The filament terminal 32*b* is in contact with a connecting component (sleeve) 9*b* fixed to the insulating member 35*b*.

From the above, the filament 31 is electrically insulated from the focusing electrode 37.

The supporting member 36 is fixed to the envelope 10 and supports the focusing electrode 37. Thus, the focusing electrode 37 is fixed to the envelope 10. The supporting member 36 is formed of a glass-fused metal. The supporting member 36 is fixed to the glass container 13 by glass fusion. In the present embodiment, the supporting member 36 is formed of KOV.

The focusing electrode 37 encloses the orbit of electrons from the filament 31 to the anode 40. The focusing electrode 37 has a function of focusing the electrons. In the present embodiment, the focusing electrode 37 extends in a direction parallel to the X-ray tube axis A.

The anode 40 is housed in the envelope 10. The anode 40 comprises an anode target 45 and an anode extension 46 connected to the anode target 45. The anode target 45 faces the cathode 30 in a direction along the X-ray tube axis A. The anode target 45 has an anode target body 41 and a target layer 42 provided at an end face location on the cathode 30 side of the anode target body 41. The anode target body 41 is formed in a columnar shape. The anode target body 41 is formed of a metal with high thermal conductivity such as copper or a copper alloy.

The target layer 42 is formed in the shape of a disc. The target layer 42 is formed of a high melting point metal such as tungsten (W) and tungsten alloy. The target layer 42 has the target surface 43 on a side facing the cathode 30. On the target surface 43, a focal spot F is formed where electrons emitted from the filament 31 collide and emit X-rays.

The anode extension 46, like the anode target body 41, is formed in a columnar shape by a metal with high thermal conductivity such as copper or a copper alloy. The anode extension 46 fixes the anode target body 41 and transfers heat generated in the anode target 45 to the surrounding area.

Note that the second metal container 12 described above is vacuum-tightly fixed to at least one of the anode target body 41 and the anode extension 46. Here, the second metal container 12 is vacuum-tightly connected to the anode extension 46 by brazing.

As shown in FIG. 1, the cathode hood assembly 5 comprises a cathode hood 50 and an X-ray transmission window 60 as a first X-ray transmission window.

The cathode hood 50 is formed in a cylindrical shape. The cathode hood 50 surrounds the anode target 45. The cathode hood 50 has a gap around its entire circumference between it and the outer circumferential surface of the anode target body 41. The cathode hood 50 also has a gap around its entire circumference between it and the glass container 13. The cathode hood 50 is formed of metal. The cathode hood 50 is set at the same potential as the cathode 30. In the present embodiment, one end of the cathode hood 50 is fixed to the focusing electrode 37, and the cathode hood 50 is set at the same potential as the focusing electrode 37.

The cathode hood 50 encloses the orbit of electrons from the filament 31 to the focal spot F and the anode target 45. The cathode hood 50 has an opening 50*w* formed thereon as a first opening through which X-rays pass. The opening 50*w* is located between the target surface 43 and the X-ray transmission window 22. In the present embodiment, the opening 50*w* is located between the target surface 43 and the X-ray transmission window 22 in a vertical direction d perpendicular to the X-ray tube axis A. By providing the opening 50*w*, the absorption of the utilized X-rays by the cathode hood 50 can be reduced to 0%. The cathode hood 50 is formed of a metal such as stainless steel or nickel. The cathode hood 50 may be formed by applying nickel plating on an iron body.

The X-ray tube 1 comprises the X-ray transmission window 60. The X-ray transmission window 60 has a higher X-ray transmittance than the X-ray transmittance of the cathode hood 50. In the present embodiment, the X-ray transmission window 60 is formed of beryllium. The X-ray transmission window 60 is a Be plate. Note that the opening 13*w* of the envelope 10 faces the X-ray transmission window 60.

Figure 2:
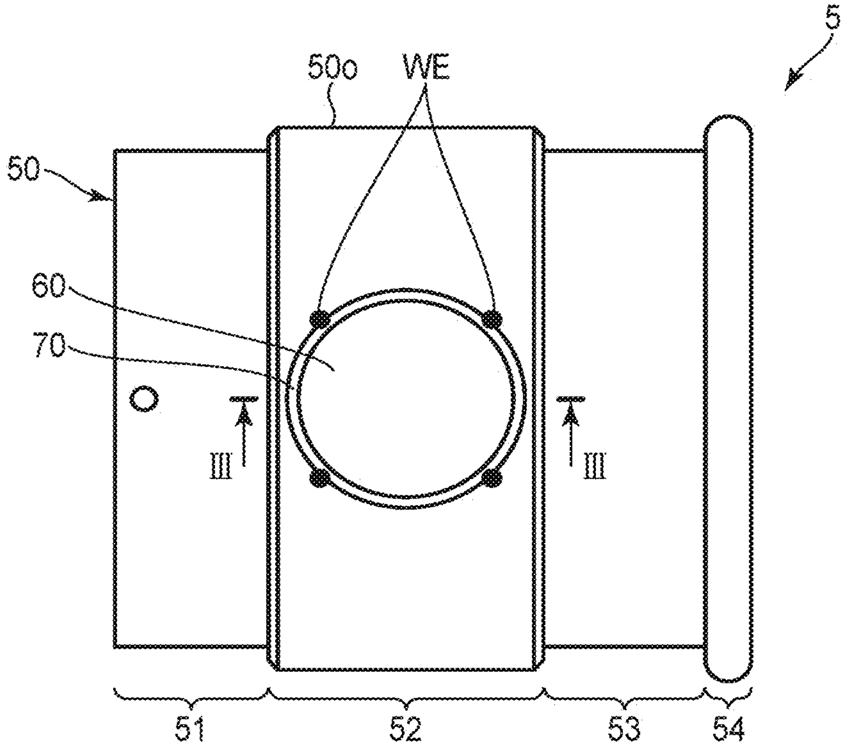
FIG. 2 is a front view showing a cathode hood assembly of the X-ray tube according to the above embodiment.
Figure 3:
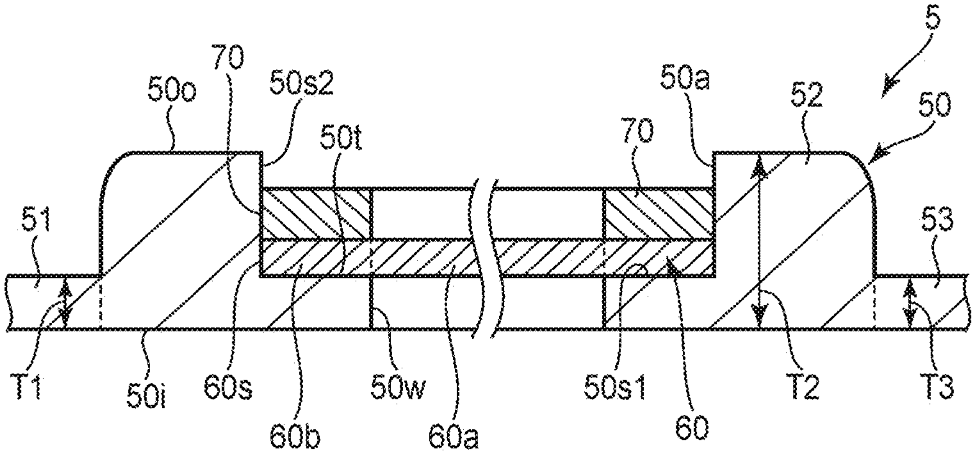
FIG. 3 is a cross-sectional view showing the cathode hood assembly of FIG. 2 along line III-III.
Figure 4:
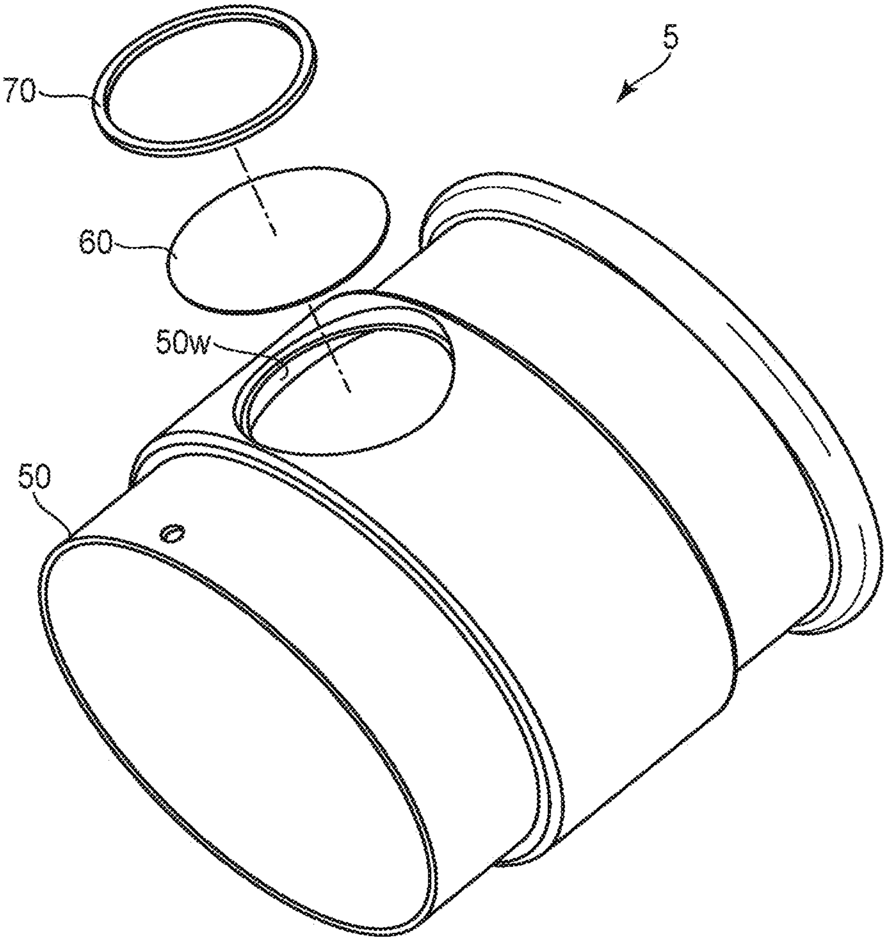
FIG. 4 is an exploded perspective view showing the cathode hood assembly according to the above embodiment.

FIG. 2 is a front view showing the cathode hood assembly 5 of the X-ray tube 1 according to the present embodiment. FIG. 3 is a cross-sectional view showing the cathode hood assembly 5 of FIG. 2 along line III-III. FIG. 4 is an exploded perspective view showing the cathode hood assembly 5 according to the present embodiment.

As shown in FIG. 1 to FIG. 4, the X-ray transmission window 60 blocks at least a part of the opening 50*w* of the cathode hood 50. In the present embodiment, the X-ray transmission window 60 blocks the entire opening 50*w* of the cathode hood 50. The X-ray transmission window 60 has a first area 60*a* facing the opening 50*w* of the cathode hood 50, a frame-like second area 60*b* enclosing the first area, and a side surface 60*s* overlapping an outer edge of the second area. The side surface 60*s* functions as a first side surface.

The cathode hood 50 has an inner circumferential surface 50*i*, an outer circumferential surface 500 on the opposite side of the inner circumferential surface, a hole 50*a*, a bottom surface 50*s*1 in the hole 50*a*, and an inner wall surface 50*s*2 in the hole 50*a*. The inner circumferential surface 50*i* encloses the orbit of electrons and the anode target 45. The hole 50*a* functions as a first hole. The bottom surface 50*s*1 functions as a first bottom surface.

The hole 50*a* is open on the outer circumferential surface 500 and recessed toward the inner circumferential surface 50*i* to house the X-ray transmission window 60. In a case where the hole 50*a* and the opening 50*w* are viewed from the front, the hole 50*a* and the opening 50*w* each have a circular shape. The opening 50*w* is open on the inner circumferential surface 50*i* and the bottom surface 50*s*1, respectively. The bottom surface 50*s*1 has a frame-like overlap space 50*t* facing the second area 60*b* of the X-ray transmission window 60. The side surface 60*s* of the X-ray transmission window 60 faces the inner wall surface 50*s*2.

The cathode hood 50 has a first portion 51, a second portion 52, a third portion 53, and a fourth portion 54 aligned in a direction along the X-ray tube axis A. The first portion 51 has a thickness T1 and is formed in a cylindrical shape. The third portion 53 has a thickness T3 and is formed in a cylindrical shape. The second portion 52 has a thickness T2 greater than each of the thicknesses T1 and T3 and is formed in a cylindrical shape.

Here, a thickness T of the cathode hood 50 corresponds to a shortest distance from the inner circumferential surface 50*i* to the outer circumferential surface 500 of the cathode hood 50. In the present embodiment, the thickness T of the cathode hood 50 corresponds to a linear distance from the inner circumferential surface 50*i* to the outer circumferential surface 500 of the cathode hood 50 in the vertical direction d.

The fourth portion 54 has an outer surface formed by a curved surface. The outer surface of the fourth portion 54 is continuous from the inner circumferential surface 50*i* of the third portion 53. The fourth portion 54 is formed so that an electric field is not concentrated at a particular location.

Of the cathode hood 50, the opening 50*w*, the hole 50*a*, the bottom surface 50*s*1, the overlap space 50*t*, and the inner wall surface 50*s*2 are formed in the second portion 52.

The cathode hood assembly 5 further comprises a restraining member 70 as a first restraining member. The restraining member 70 has a framed shape. The restraining member 70 faces the second area 60*b* of the X-ray transmission window 60 and sandwiches the second area 60*b* of the X-ray transmission window 60 together with the overlap space 50*t*. The restraining member 70 has a side surface 70*s* facing the inner wall surface 50*s*2. The side surface 70*s* functions as a second side surface.

The restraining member 70 and the second portion 52 of the cathode hood 50 are welded together. In the present embodiment, the restraining member 70 and the second portion 52 of the cathode hood 50 are welded at four locations, forming four weld marks WE on the cathode hood assembly 5. The X-ray transmission window 60 is maintained in a state of being restrained at the overlap space 50*t* by the restraining member 70 fixed to the cathode hood 50. Tungsten inert gas (TIG) welding and laser welding can be utilized for the above welding.

The X-ray tube 1 is configured as described above.

In an operation of the X-ray tube 1 described above, a high voltage (X-ray tube voltage) of tens to hundreds of kV is applied between the cathode 30 and anode target 45, and a strong electric field is generated between the cathode 30 and anode target 45. In the present embodiment, the X-ray tube 1 is a cathode grounding type X-ray tube, in which the cathode 30 is grounded, and a positive high voltage is applied to the anode target 45.

However, the X-ray tube 1 may be an anode grounding type X-ray tube, in which the anode target 45 is grounded, and a negative high voltage is applied to the cathode 30. Alternatively, the X-ray tube 1 may be a neutral grounding type X-ray tube, in which a positive high voltage is applied to the anode target 45, and a negative high voltage is applied to the cathode 30.

Electrons emitted from the filament 31 are accelerated by the X-ray tube voltage to form an electron beam. In this process, the electron beam is focused by the focusing electrode 37. The electron beam collides with the target surface 43 of the target layer 42 to form the focal spot F, where it is converted into thermal energy and X-rays. Utilized X-rays among the X-rays generated from the focal spot F pass through the opening 50*w* of the cathode hood 50, pass through the X-ray transmission window 60, pass through the opening 13*w* of the envelope 10, pass through the X-ray transmission window 22, and are emitted outside the X-ray tube 1.

According to the X-ray tube 1 of one embodiment configured as described above, the X-ray tube 1 comprises the envelope 10, the cathode 30, the anode 40, and the cathode hood 50. Even if recoil electrons that are not converted into heat or X-rays and scattered are generated among the electrons colliding with the anode target, the cathode hood 50 can capture the recoil electrons.

By the way, recoil electrons fly out in all directions, and due to the electric field, they fly in the direction of lower potential. Some of those flying recoil electrons may pass through the opening 50*w* of the cathode hood 50 and collide with the envelope 10. Problems are considered to occur, such as a problem in which electrical discharges easily occur due to charging the envelope 10 positively or negatively according to a secondary electron emission coefficient, and a problem in which a vacuum-tight state cannot be maintained inside the envelope 10 due to the envelope 10 being damaged by electron impact. The above electrical discharge is the electrical discharge between the envelope 10 (glass container 13) and the cathode hood 50. In addition, the above electrical discharge may include the electrical discharge between the X-ray transmission window 22 and the cathode hood 50.

The X-ray tube 1, therefore, further comprises the X-ray transmission window 60. The X-ray transmission window 60 can block at least a part of the opening 50*w* of the cathode hood 50. Even if recoil electrons pass through the opening 50*w*, the X-ray transmission window 60 can capture the recoil electrons that pass through the opening 50*w*. The recoil electrons that pass through the opening 50*w* are less likely to collide with the envelope 10 (glass container 13) and the X-ray transmission window 22 due to the X-ray transmission window 60. Alternatively, the X-ray transmission window 60 can avoid a situation where the recoil electrons passing through the opening 50*w* collide with the envelope 10 (glass container 13) and the X-ray transmission window 22.

The X-ray tube 1 comprising the X-ray transmission window 60 can improve a withstand voltage performance compared to the X-ray tube 1 that does not comprise the X-ray transmission window 60. Therefore, it is possible to obtain an X-ray tube 1 that operates stably over a long period of time.

Modified Example 1

Figure 5:
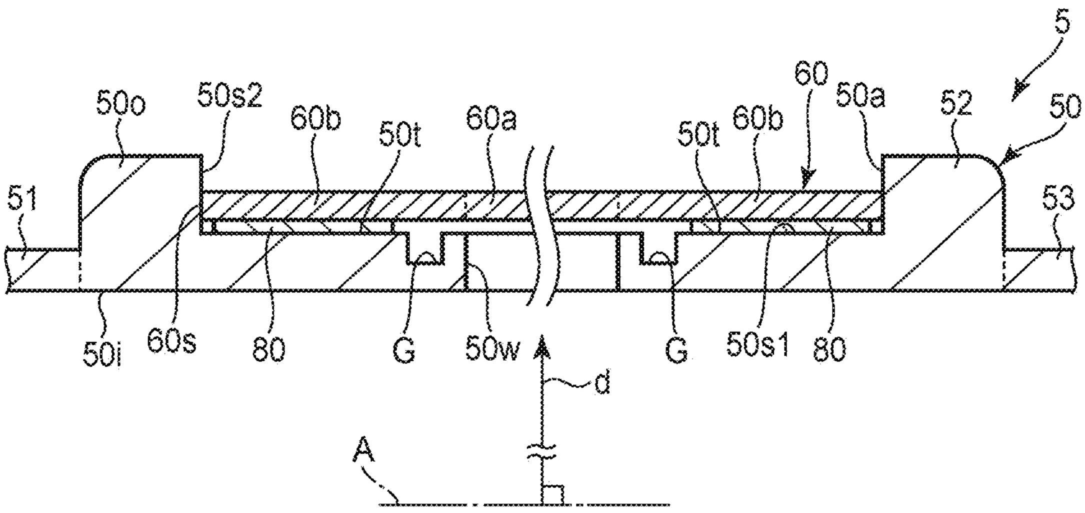
FIG. 5 is a cross-sectional view showing a cathode hood assembly of an X-ray tube according to modified example 1 of the above embodiment.
Figure 6:
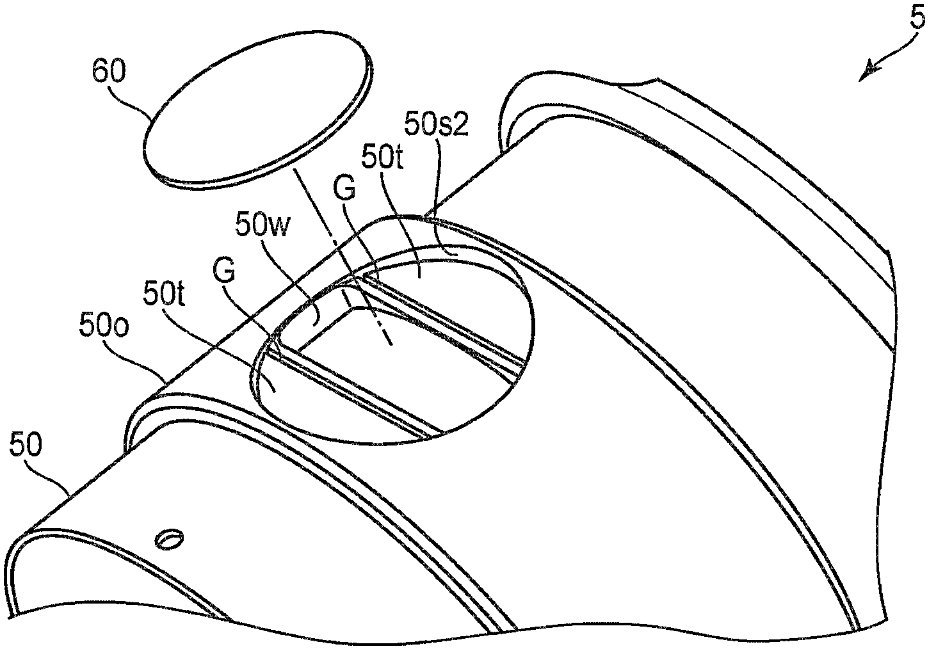
FIG. 6 is an exploded perspective view showing the cathode hood assembly according to modified example 1 above.

Next, modified example 1 of the above embodiment will be described. FIG. 5 is a cross-sectional view showing a cathode hood assembly 5 of an X-ray tube 1 according to modified example 1. FIG. 6 is an exploded perspective view showing the cathode hood assembly 5 according to modified example 1. Note that, in FIG. 6, a brazing material 80 is not shown. The X-ray tube 1 of modified example 1 is configured in the same manner as the X-ray tube 1 of the above embodiment, except for configurations described in modified example 1.

As shown in FIG. 5 and FIG. 6, an X-ray transmission window 60 may be fixed to a cathode hood 50 utilizing brazing (vacuum brazing or hydrogen brazing) instead of welding. The cathode hood assembly 5 comprises the brazing material 80 instead of a restraining member 70. The brazing material 80 is located between the cathode hood 50 and the X-ray transmission window 60 and fixes the X-ray transmission window 60 to the cathode hood 50. In a case where a hole 50*a* and an opening 50*w* are viewed from the front, the hole 50*a* has a circular shape, and the opening 50*w* has a rectangular (ovally rounded rectangular) shape. The ovally rounded rectangle has two parallel lines with equal length, and two semi-circles with an equal radius. A long axial direction of the opening 50*w* is perpendicular to a direction parallel to an X-ray tube axis A and is perpendicular to a vertical direction d which is perpendicular to the X-ray tube axis A and directed toward the center of the hole 50*a*.

The X-ray transmission window 60 has a first area 60*a* facing the opening 50*w* and a second area 60*b* located outside the above first area. In modified example 1, the second area 60*b* is divided into two areas on both sides of the first area 60*a*.

A bottom surface 50*s*1 in the hole 50*a* of the cathode hood 50 has an overlap space 50*t* facing the second area 60*b* of the X-ray transmission window 60. In modified example 1, the overlap space 50*t* is divided into two parts on both sides of the opening 50*w*.

The brazing material 80 is located between the overlap space 50*t* and the second area 60*b* of the X-ray transmission window 60. The brazing material 80 fixes the second area 60*b* of the X-ray transmission window 60 to the overlap space 50*t*. In modified example 1, the brazing material 80 is provided in each of the spaces between the overlap space 50*t* and the second area 60*b*.

Furthermore, the cathode hood 50 has a groove G. In modified example 1, the cathode hood 50 has two grooves G located on both sides of the opening 50*w*. Each groove G is located between the opening 50*w* and the overlap space 50*t*, is open on the bottom surface 50*s*1, and is recessed toward an inner circumferential surface 50*i*. By forming the grooves G in the cathode hood 50, excess brazing material 80 can be housed during a manufacturing process of the cathode hood assembly 5. The brazing material 80 is less likely to leak into the opening 50*w*.

In modified example 1, the groove G extends in the long axial direction of the opening 50*w*, and both ends of the groove G are connected to an inner wall surface 50*s*2. In the manufacturing process of the cathode hood assembly 5, the excess brazing material 80 always passes through the groove G on its way from above the overlap space 50*t* to the opening 50*w*. Therefore, a situation where the brazing material 80 leaks into the opening 50*w* can be avoided.

In modified example 1, the same effect as in the above embodiment can also be obtained.

Due to the collision of the recoil electrons, the recoil electrons are converted into thermal energy at the X-ray transmission window 60. In a case where an area where the X-ray transmission window 60 is in contact with the cathode hood 50 is small, a heat transfer path between the X-ray transmission window 60 and the cathode hood 50 is insufficient, and heat conduction from the X-ray transmission window 60 to the cathode hood 50 becomes insufficient. For example, the temperature of the X-ray transmission window 60 may rise locally, resulting in damage to the X-ray transmission window 60. If the X-ray transmission window 60 is damaged during operation of the X-ray tube 1, the amount of X-rays emitted by the X-ray tube 1 will become uneven. This would cause abnormalities in X-ray images taken by an X-ray device including the X-ray tube 1. In addition, problems such as a situation where the X-ray device is stopped may occur.

Therefore, in modified example 1, the X-ray transmission window 60 is brazed to the cathode hood 50. The brazing material 80 ensures a sufficient heat transfer path from the X-ray transmission window 60 to the cathode hood 50. Temperature rise in the X-ray transmission window 60 can be suppressed when recoil electrons collide with the X-ray transmission window 60. Compared to the X-ray tube 1 of the above embodiment, the X-ray tube 1 of modified example 1 can suppress damage to the X-ray transmission window 60. Alternatively, the X-ray tube 1 of modified example 1 can prevent damage to the X-ray transmission window 60.

The X-ray tube 1 is formed without a restraining member 70 that is welded to the cathode hood 50. There are no weld marks (WE) on an outer circumferential surface 500 of the cathode hood 50. Protrusions, which cause electric field concentration and cause electrical discharges, are not formed on the outer circumferential surface 500 of the cathode hood 50. The X-ray tube 1 of modified example 1 can improve the withstand voltage performance compared to the X-ray tube 1 of the above embodiment.

The cathode hood 50 has the groove G. Since a situation in which the brazing material 80 leaks into the opening 50*w* can be avoided, a situation in which an abnormality occurs in the X-ray images taken by the X-ray device can be avoided.

The shape of the opening 50*w* of the cathode hood 50 is not limited to a rectangle and may also be circular. For example, in a case where the shape of the opening 50*w* is circular, the overlap space 50*t* and the groove G each have an annular shape, and the groove G extends continuously.

Modified Example 2

Figure 7:
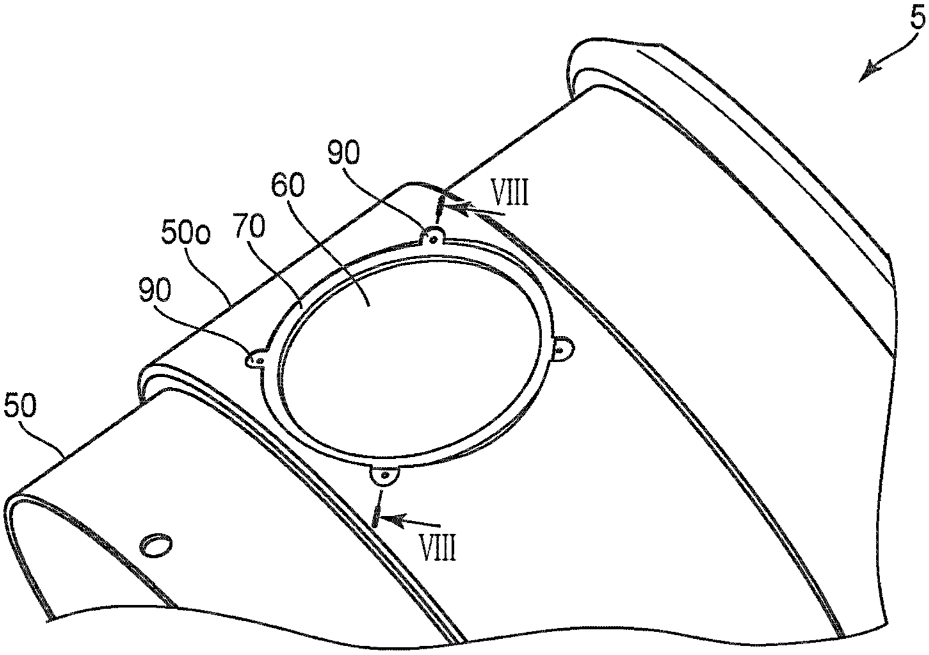
FIG. 7 is an exploded perspective view showing a cathode hood assembly of an X-ray tube according to modified example 2 of the above embodiment.
Figure 8:
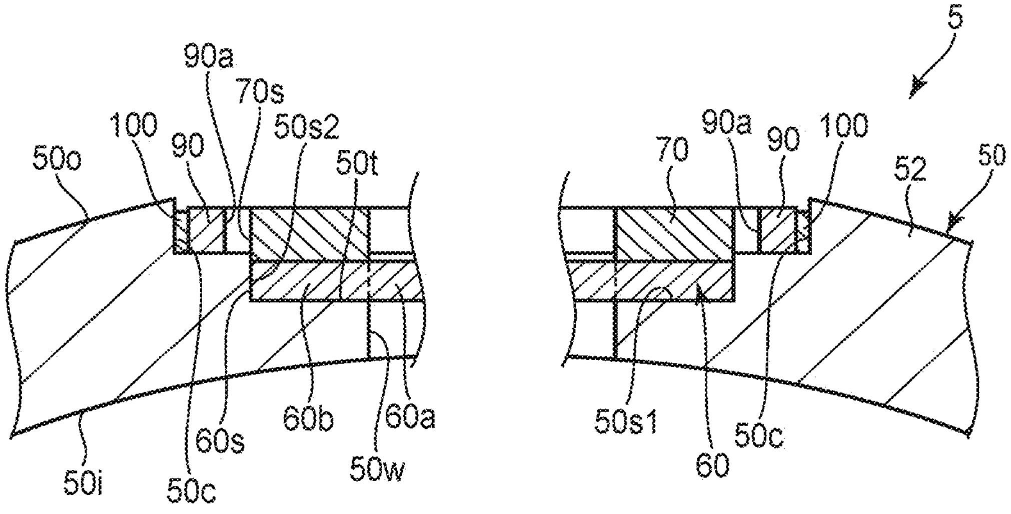
FIG. 8 is a cross-sectional view showing the cathode hood assembly of FIG. 7 along line VIII-VIII.
Figure 9:
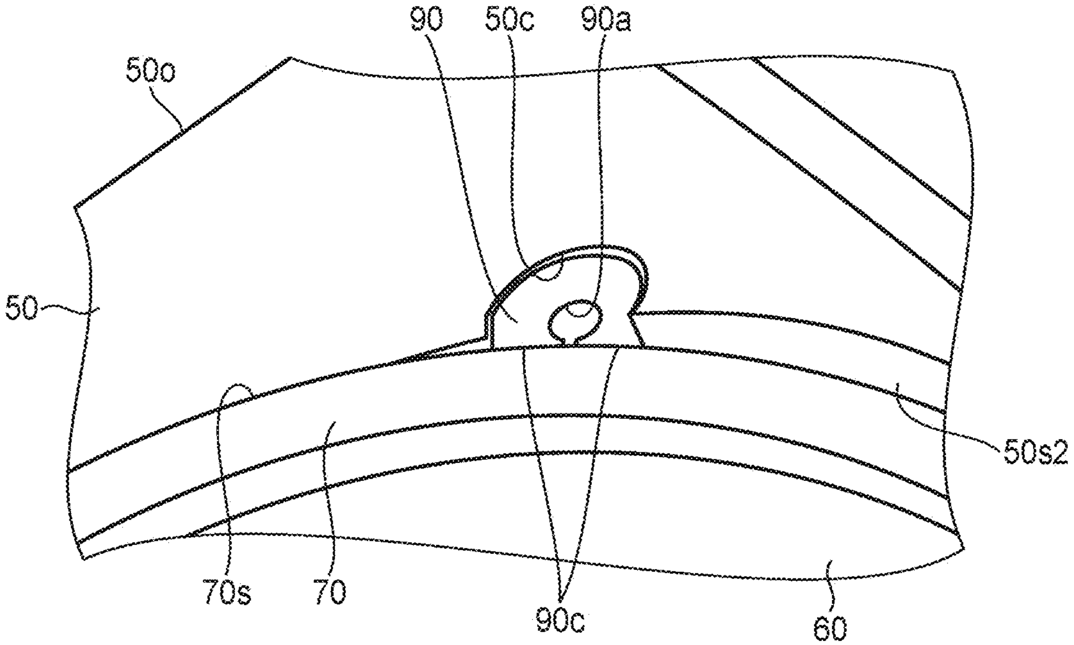
FIG. 9 is a perspective view showing an enlarged portion of the cathode hood assembly according to modified example 2 above.

Next, modified example 2 of the above embodiment will be described. FIG. 7 is an exploded perspective view showing a cathode hood assembly 5 of an X-ray tube 1 according to modified example 2. FIG. 8 is a cross-sectional view of the cathode hood assembly 5 of FIG. 7 along line VIII-VIII. FIG. 9 is a perspective view showing an enlarged portion of the cathode hood assembly 5 according to modified example 2. The X-ray tube 1 of modified example 2 is configured in the same manner as the X-ray tube 1 of the above embodiment, except for configurations described in modified example 2.

As shown in FIG. 7 to FIG. 9, an X-ray transmission window 60 is not brazed to a cathode hood 50. The cathode hood assembly 5 further comprises a restraining member 90. In modified example 2, the cathode hood assembly 5 has four restraining members 90 as a plurality of restraining members 90. Each of the restraining members 90 functions as a second restraining member. The X-ray transmission window 60 has a first area 60*a* facing an opening 50*w*, a frame-like second area 60*b* enclosing the first area 60*a*, and a side surface 60*s* overlapping an outer edge of the above second area.

The cathode hood 50 has an inner circumferential surface 50*i*, an outer circumferential surface 500, a hole 50*a*, a bottom surface 50*s*1, an inner wall surface 50*s*2, and a concave surface 50*c* opening on the above inner wall surface. In modified example 2, the cathode hood 50 has four concave surfaces 50*c* as a plurality of concave surfaces 50*c*. Each concave surface 50*c* is open not only on the inner wall surface 50*s*2 but also on the outer circumferential surface 500.

The bottom surface 50*s*1 of the cathode hood 50 has a frame-like overlap space 50*t* facing the second area 60*b* of the X-ray transmission window 60. The side surface 60*s* of the X-ray transmission window 60 faces the inner wall surface 50*s*2. A restraining member 70 has a framed shape. The restraining member 70 faces the second area 60*b* of the X-ray transmission window 60 and sandwiches the second area 60*b* of the X-ray transmission window 60 together with the overlap space 50*t*. The restraining member 70 has a side surface 70*s* facing the inner wall surface 50*s*2.

The restraining member 90 is located in the space enclosed by the concave surface 50*c* of the cathode hood 50 and the side surface 70*s* of the restraining member 70. The restraining member 90 is formed of a metal softer than the material forming the cathode hood 50. In modified example 2, the restraining member 90 is formed of copper. The restraining member 90 has a contact surface 90*c* that is pressed against the side surface 70*s* of the restraining member 70.

In modified example 2, the concave surface 50*c* is a round concave surface and is curved. The restraining member 90 is fixed to the cathode hood 50 by a brazing material 100. The restraining member 90 has a round concave portion 90*a* extending in a direction from the inner circumferential surface 50*i* toward the outer circumferential surface 500 of the cathode hood 50 and opening on the side surface 70*s* side. In the manufacturing process of the cathode hood assembly 5, the contact surface 90*c* of the restraining member 90 can be tightly adhered to the side surface 70*s* of the restraining member 70 by expanding the concave portion 90*a* after the X-ray transmission window 60 is loaded.

From the above, the restraining member 90 physically fixes the restraining member 70 by caulking. The X-ray transmission window 60 is maintained in a state of being restrained to the overlap space 50*t* by the restraining member 70 and the restraining member 90.

Note that the cathode hood assembly 5 may be formed without the brazing material 100. For example, the restraining member 90 may be caulked to the concave surface 50*c* of the cathode hood 50.

In modified example 2, the same effects as in the above embodiment can be obtained.

In a case of fixing the location of the X-ray transmission window 60 with respect to the cathode hood 50, not the cathode hood 50 but the restraining member 90, which is formed of a metal softer than the material forming the cathode hood 50, is plastically deformed. In other words, the concave portion 90*a* of the restraining member 90 is widened. In the manufacturing process of the cathode hood assembly 5, stress applied to the cathode hood 50 can be suppressed, and plastic deformation of the cathode hood 50 can be suppressed or prevented.

From the above, the occurrence of problems that may occur in the case where the cathode hood 50 is plastically deformed can be suppressed or prevented. For example, it is possible to suppress or prevent the occurrence of a problem of the occurrence of electric discharge, a problem of the occurrence of abnormality in the shape of the focal spot, a problem of the occurrence of abnormality in the size of the focal spot. Therefore, it is possible to obtain the X-ray tube 1 with a high manufacturing yield.

In addition, since the copper restraining member 90 has excellent thermal conductivity, heat generated in the X-ray transmission window 60 can be transferred favorably to the cathode hood 50.

Modified Example 3

Figure 10:
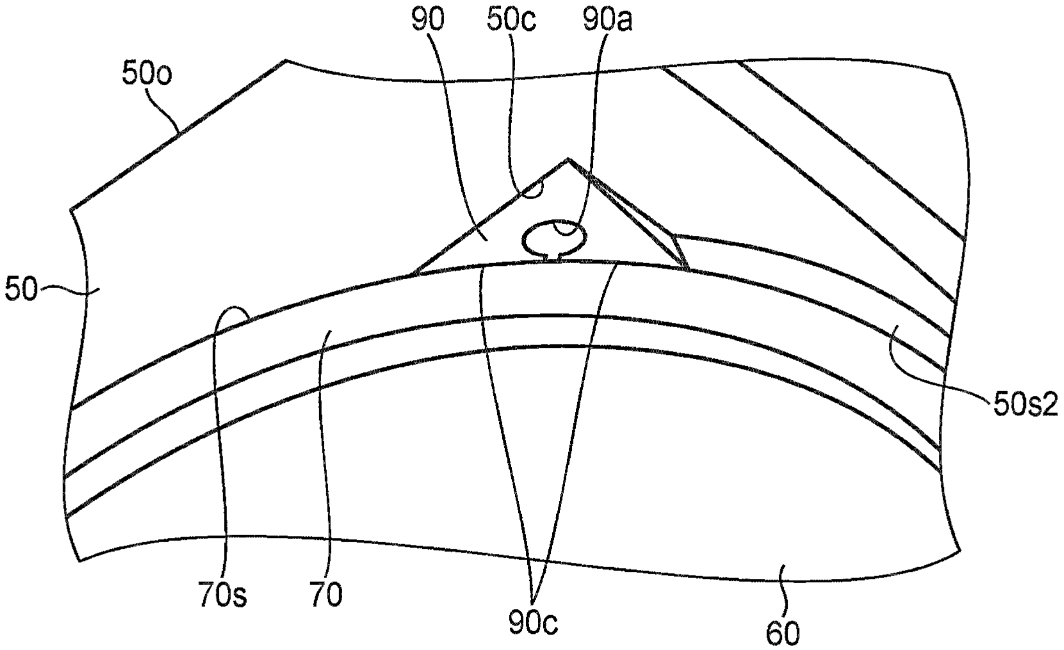
FIG. 10 is a perspective view showing an enlarged portion of a cathode hood assembly of an X-ray tube according to modified example 3 of the above embodiment.

Next, modified example 3 of the above embodiment will be described. FIG. 10 is a perspective view showing an enlarged portion of a cathode hood assembly 5 of an X-ray tube 1 according to modified example 3.

As shown in FIG. 10, unlike modified example 2 above, a concave surface 50*c* of a cathode hood 50 may be a square-shaped concave surface. A restraining member 90 has an oval-shaped concave portion 90*a*. In modified example 3, the same effect as in modified example 2 above can be obtained.

Modified Example 4

Figure 11:
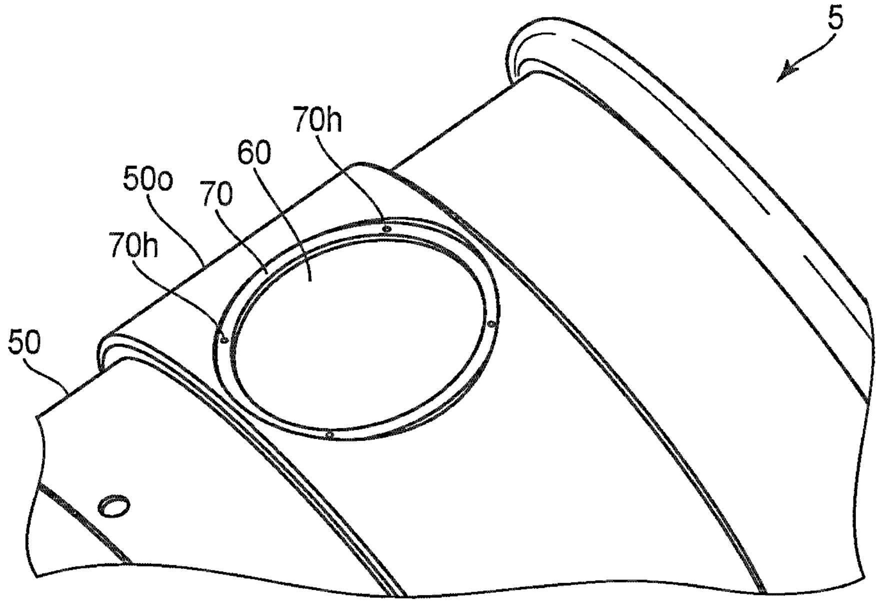
FIG. 11 is a perspective view showing a cathode hood assembly of an X-ray tube according to modified example 4 of the above embodiment.
Figure 12:
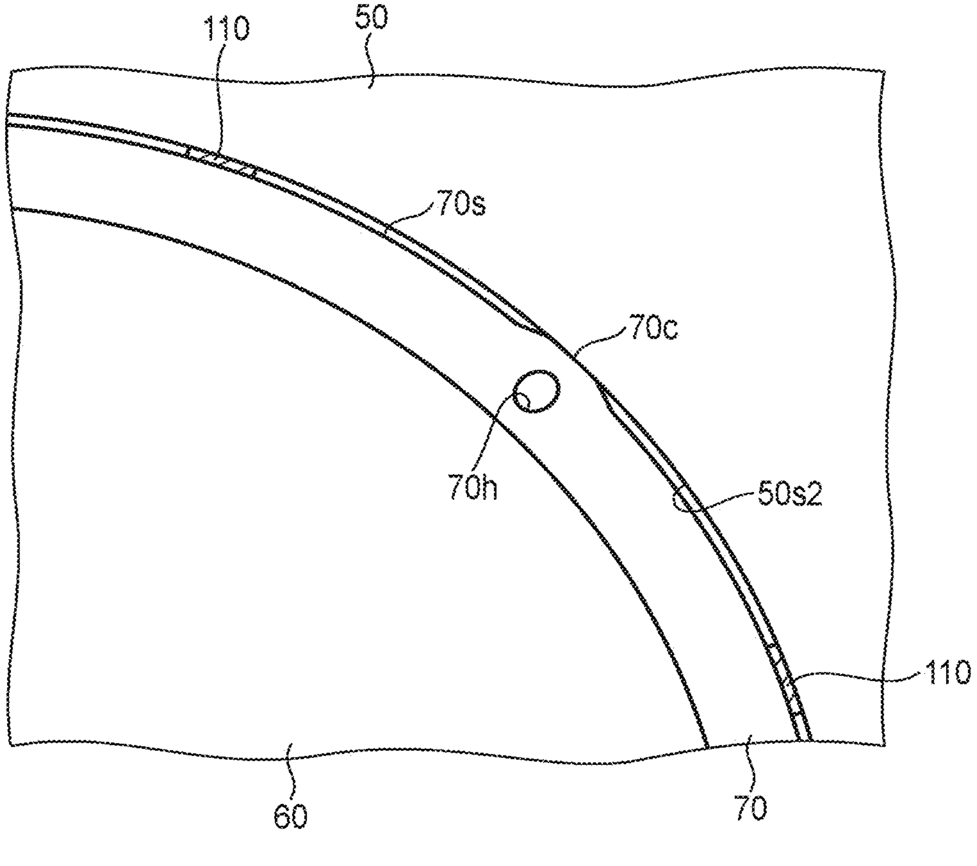
FIG. 12 is a front view of an enlarged portion of the cathode hood assembly according to modified example 4 above.

Next, modified example 4 of the above embodiment will be described. FIG. 11 is a perspective view showing the cathode hood assembly 5 of an X-ray tube 1 according to modified example 4. FIG. 12 is a front view showing an enlarged portion of the cathode hood assembly 5 according to modified example 4. The X-ray tube 1 of modified example 4 is configured in the same manner as the X-ray tube 1 of the above embodiment, except for configurations described in modified example 4.

As shown in FIG. 11 and FIG. 12, a restraining member 70 is not welded to a cathode hood 50. The restraining member 70 is formed of a metal softer than the material forming the cathode hood 50. In modified example 4, the restraining member 70 is formed of copper. A side surface 70*s* of the restraining member 70 has a contact surface 70*c* that is pressed against an inner wall surface 50*s*2 of the cathode hood 50.

The restraining member 70 has a round through-hole 70*h* extending in a direction from an inner circumferential surface 50*i* of the cathode hood 50 toward an outer circumferential surface 500 of the cathode hood 50. In modified example 4, the restraining member 70 has four through-holes 70*h* as a plurality of through-holes. In the manufacturing process of the cathode hood assembly 5, after an X-ray transmission window 60 is loaded and the restraining member 70 is brazed to the cathode hood 50 by a brazing material 110, the through-holes 70*h* are widened. The contact surface 70*c* of the restraining member 70 can be tightly adhered to the inner wall surface 50*s*2 of the cathode hood 50.

From the above, the restraining member 70 is physically fixed to the cathode hood 50 by caulking. The X-ray transmission window 60 is maintained in a state of being restrained to an overlap space 50*t* by the restraining member 70. In modified example 4, plastic deformation of the cathode hood 50 can be suppressed or prevented, and the same effects as those in the above modified examples 2 and 3 can be obtained.

Modified Example 5

Figure 13:
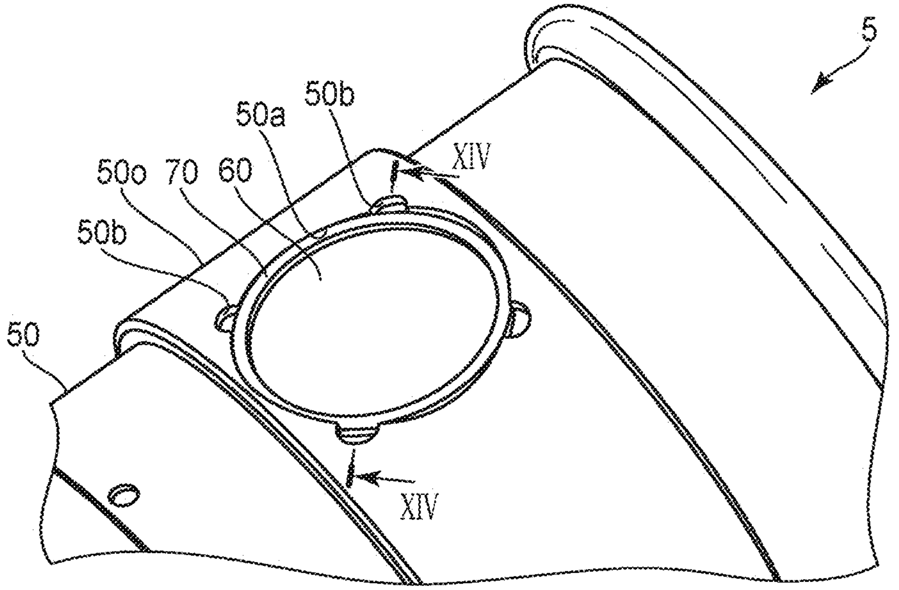
FIG. 13 is a perspective view showing a cathode hood assembly of an X-ray tube according to modified example 5 of the above embodiment.
Figure 14:
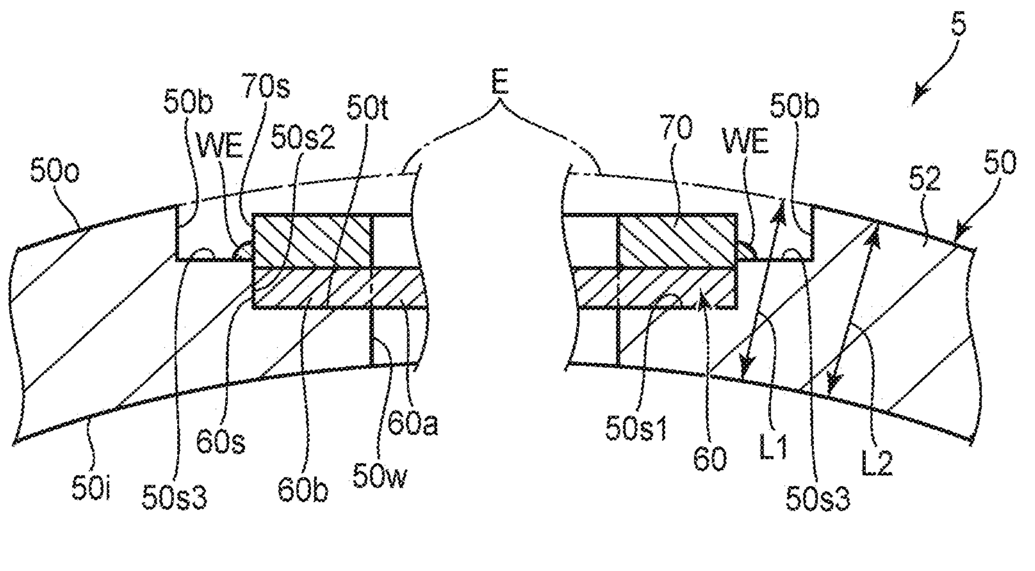
FIG. 14 is a cross-sectional view showing the cathode hood assembly of FIG. 13 along line XIV-XIV.

Next, modified example 5 of the above embodiment will be described. FIG. 13 is a perspective view showing a cathode hood assembly 5 of an X-ray tube according to modified example 5. FIG. 14 is a cross-sectional view showing the cathode hood assembly 5 of FIG. 13 along line XIV-XIV. An X-ray tube 1 of modified example 5 is configured in the same manner as the X-ray tube 1 of the above embodiment, except for configurations described in modified example 5.

As shown in FIG. 13 and FIG. 14, a cathode hood 50 further has a hole 50*b* and a bottom surface 50*s*3 in the hole 50*b*. The hole 50*b* functions as a second hole, and the bottom surface 50*s*3 functions as a second bottom surface. In modified example 5, the cathode hood 50 has four holes 50*b* as a plurality of holes. Each of the holes 50*b* is continuous from a hole 50*a*, is open on an outer circumferential surface 500, and is recessed toward an inner circumferential surface 50*i*.

A restraining member 70 and the bottom surface 50*s*3 of cathode hood 50 are welded. An X-ray transmission window 60 is maintained in a state of being restrained to an overlap space 50*t* by the restraining member 70 fixed to the cathode hood 50. A weld mark WE between the restraining member 70 and the bottom surface 50*s*3 of cathode hood 50 is located on the inner circumferential surface 50*i* side from a virtual extended surface E of the outer circumferential surface 500.

Since the weld mark WE is formed at a location that is one step recessed from the outer circumferential surface 500, concentration of electric field on the weld mark WE can be mitigated. Note that, in a vertical direction d, a distance L1 from an X-ray tube axis A to the extended surface E is the same as a distance L2 from the X-ray tube axis A to the outer circumferential surface 500. Unlike in modified example 5, the weld mark WE may be formed at a location that is multiple steps recessed from the outer circumferential surface 500.

In modified example 5, the same effect as in the above embodiment can be obtained. In addition, the X-ray tube 1 of modified example 5 can improve the withstand voltage performance compared to the X-ray tube 1 of the above embodiment.

Modified Example 6

Figure 15:
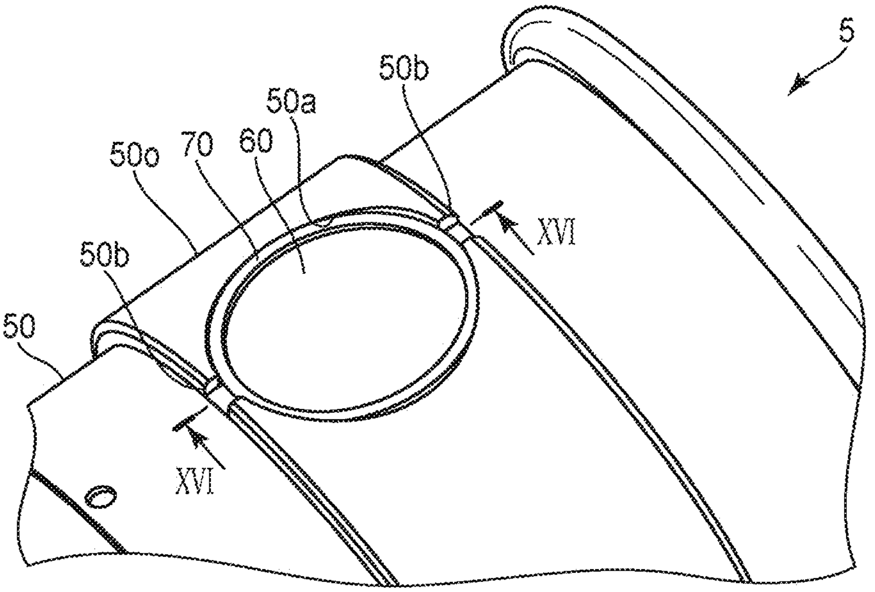
FIG. 15 is a perspective view showing a cathode hood assembly of an X-ray tube according to modified example 6 of the above embodiment.
Figure 16:
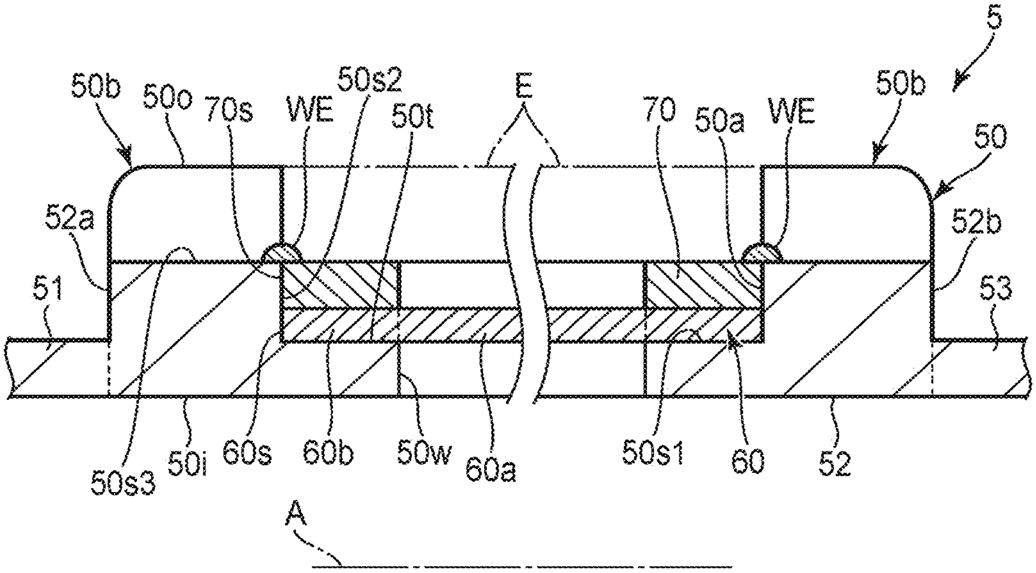
FIG. 16 is a cross-sectional view showing the cathode hood assembly of FIG. 15 along line XVI-XVI.

Next, modified example 6 of the above embodiment will be described. FIG. 15 is a perspective view showing a cathode hood assembly 5 of an X-ray tube 1 of modified example 6. FIG. 16 is a cross-sectional view showing the cathode hood assembly 5 of FIG. 15 along line XVI-XVI.

As shown in FIG. 15 and FIG. 16, a hole 50*b* of a cathode hood 50 may extend in a direction along an X-ray tube axis A. In modified example 6, the cathode hood 50 has two holes 50*b*. Each hole 50*b* is open on an outer circumferential surface 500 and an inner wall surface 50*s*2. Furthermore, each hole 50*b* is open on an end face 52*a* of a second portion 52 on a first portion 51 side or on an end face 52*b* of the second portion 52 on a third portion 53 side.

In modified example 6, a weld mark WE between a restraining member 70 and a bottom surface 50*s*3 of the cathode hoods 50 is located on an inner circumferential surface 50*i* side from the outer circumferential surface 500 and a virtual extended surface E. Also in modified example 6, the same effect as in modified example 5 above can be obtained.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the embodiment and a plurality of modified examples of the present invention can be applied to various types of stationary anode X-ray tubes.

Inventions according to the above-explained embodiments and modified examples will be additionally described below.

(1) An X-ray tube comprising:
- a cathode having an electron emission source that emits electrons;
- an anode having an anode target facing the cathode in a direction along an X-ray tube axis, and in which a focal spot is formed where electrons emitted from the electron emission source collide to emit X-rays;
- a cathode hood enclosing an orbit of electrons from the electron emission source to the focal spot and the anode target, and on which a first opening through which X-rays pass is formed;
- a first X-ray transmission window blocking at least a part of the first opening and having an X-ray transmittance higher than an X-ray transmittance of the cathode hood; and
- an envelope housing the cathode, the anode target, the cathode hood, and the first X-ray transmission window.

(2) The X-ray tube of (1), further comprising:
- a brazing material located between the cathode hood and the first X-ray transmission window and fixing the first X-ray transmission window to the cathode hood.

(3) The X-ray tube of (2), wherein
- the first X-ray transmission window has a first area facing the first opening and a second area located outside the first area,
- the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, and a first bottom surface in the first hole, the first opening is open on the inner circumferential surface and on the first bottom surface, respectively, the first bottom surface has an overlap space facing the second area of the first X-ray transmission window, and the brazing material is located between the overlap space and the second area of the first X-ray transmission window and fixes the second area of the first X-ray transmission window to the overlap space.

(4) The X-ray tube of (3), wherein the cathode hood has a groove that is located between the first opening and the overlap space, is open on the first bottom surface, and is recessed toward the inner circumferential surface.

(5) The X-ray tube of (1), further comprising:

a first restraining member, wherein the first X-ray transmission window has a first area facing the first opening, a frame-like second area enclosing the first area, and a first side surface overlapping an outer edge of the second area, the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, a first bottom surface in the first hole, and an inner wall surface in the first hole, the first opening is open on the inner circumferential surface and the first bottom surface, respectively, the first bottom surface has a frame-like overlap space facing the second area of the first X-ray transmission window, the first side surface of the first X-ray transmission window faces the inner wall surface, the first restraining member faces the second area of the first X-ray transmission window, sandwiches the second area of the first X-ray transmission window together with the overlap space, has a framed shape and a second side surface facing the inner wall surface, and is formed of a metal softer than a material forming the cathode hood, the second side surface has a contact surface that is pressed against the inner wall surface, and the first X-ray transmission window is maintained in a state of being restrained to the overlap space by the first restraining member.

(6) The X-ray tube of (1), further comprising:

a first restraining member and a second restraining member, wherein the first X-ray transmission window has a first area facing the first opening, a frame-like second area enclosing the first area, and a first side surface overlapping an outer edge of the second area, the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, a first bottom surface in the first hole, an inner wall surface in the first hole, and a concave surface opening on the inner wall surface, the first opening is open on the inner circumferential surface and the first bottom surface, respectively, the first bottom surface has a frame-like overlap space facing the second area of the first X-ray transmission window, the first side surface of the first X-ray transmission window faces the inner wall surface, the first restraining member faces the second area of the first X-ray transmission window, sandwiches the second area of the first X-ray transmission window together with the overlap space, and has a framed shape and a second side surface facing the inner wall surface, the second restraining member is located in a space enclosed by the concave surface and the second side surface, is formed of a metal softer than a material forming the cathode hood, and has a contact surface that is in pressure contact with the second side surface, and the first X-ray transmission window is maintained in a state of being restrained to the overlap space by the first restraining member and the second restraining member.

(7) The X-ray tube of (1), further comprising:

a first restraining member, wherein the first X-ray transmission window has a first area facing the first opening, a frame-like second area enclosing the first area, and a first side surface overlapping an outer edge of the second area, the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, a first bottom surface in the first hole, an inner wall surface in the first hole, a second hole continuous from the first hole, opening on the outer circumferential surface, and recessed toward the inner circumferential surface, and a second bottom surface in the second hole, the first opening is open on the inner circumferential surface and on the first bottom surface, respectively, the first bottom surface has a frame-like overlap space facing the second area of the first X-ray transmission window, the first side surface of the first X-ray transmission window faces the inner wall surface, the first restraining member faces the second area of the first X-ray transmission window, sandwiches the second area of the first X-ray transmission window together with the overlap space, and has a framed shape and a second side surface facing the inner wall surface, the first restraining member and the second bottom surface are welded together, and the first X-ray transmission window is maintained in a state of being restrained to the overlap space by the first restraining member fixed to the cathode hood.

(8) The X-ray tube of (7), wherein a weld mark between the first restraining member and the second bottom surface is located on the inner circumferential surface side from a virtual extended surface of the outer circumferential surface.

(9) The X-ray tube of (1), wherein the first X-ray transmission window is formed of beryllium.

(10) The X-ray tube of (1), wherein the envelope is formed of glass.

(11) The X-ray tube of (1), further comprising:
an X-ray transmission assembly,
wherein
the envelope has a second opening facing the first X-ray transmission window, and
the X-ray transmission assembly has:
a window frame vacuum-tightly attached to the envelope and enclosing the second opening; and
a second X-ray transmission window housed in the window frame, vacuum-tightly closing the second opening together with the window frame, and having an X-ray transmittance higher than an X-ray transmittance of the window frame.

What is claimed is:

1. An X-ray tube comprising:
a cathode having an electron emission source that emits electrons;
an anode having an anode target facing the cathode in a direction along an X-ray tube axis, and in which a focal spot is formed where electrons emitted from the electron emission source collide to emit X-rays;
a cathode hood enclosing an orbit of electrons from the electron emission source to the focal spot and the anode target, and on which a first opening through which X-rays pass is formed;
a first X-ray transmission window blocking at least a part of the first opening and having an X-ray transmittance higher than an X-ray transmittance of the cathode hood;
an envelope housing the cathode, the anode target, the cathode hood, and the first X-ray transmission window; and
a first restraining member,
wherein
the first X-ray transmission window has a first area facing the first opening, a frame-like second area enclosing the first area, and a first side surface overlapping an outer edge of the second area,
the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, a first bottom surface in the first hole, and an inner wall surface in the first hole,
the first opening opens on the inner circumferential surface and the first bottom surface, respectively,
the first bottom surface has a frame-like overlap space facing the second area of the first X-ray transmission window,
the first side surface of the first X-ray transmission window faces the inner wall surface,
the first restraining member faces the second area of the first X-ray transmission window, sandwiches the second area of the first X-ray transmission window together with the overlap space, has a framed shape and a second side surface facing the inner wall surface, and is formed of a metal softer than a material forming the cathode hood,
the second side surface has a contact surface that is pressed against the inner wall surface, and
the first X-ray transmission window is maintained in a state of being restrained to the overlap space by the first restraining member.

2. An X-ray tube comprising:
a cathode having an electron emission source that emits electrons;
an anode having an anode target facing the cathode in a direction along an X-ray tube axis, and in which a focal spot is formed where electrons emitted from the electron emission source collide to emit X-rays;
a cathode hood enclosing an orbit of electrons from the electron emission source to the focal spot and the anode target, and on which a first opening through which X-rays pass is formed;
a first X-ray transmission window blocking at least a part of the first opening and having an X-ray transmittance higher than an X-ray transmittance of the cathode hood;
an envelope housing the cathode, the anode target, the cathode hood, and the first X-ray transmission window; and
a first restraining member and a second restraining member,
wherein
the first X-ray transmission window has a first area facing the first opening, a frame-like second area enclosing the first area, and a first side surface overlapping an outer edge of the second area,
the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, a first bottom surface in the first hole, an inner wall surface in the first hole, and a concave surface opening on the inner wall surface,
the first opening is open on the inner circumferential surface and the first bottom surface, respectively,
the first bottom surface has a frame-like overlap space facing the second area of the first X-ray transmission window,
the first side surface of the first X-ray transmission window faces the inner wall surface,
the first restraining member faces the second area of the first X-ray transmission window, sandwiches the second area of the first X-ray transmission window together with the overlap space, and has a framed shape and a second side surface facing the inner wall surface,
the second restraining member is located in a space enclosed by the concave surface and the second side surface, is formed of a metal softer than a material forming the cathode hood, and has a contact surface that is pressed against the second side surface, and
the first X-ray transmission window is maintained in a state of being restrained to the overlap space by the first restraining member and the second restraining member.

3. An X-ray tube comprising:
a cathode having an electron emission source that emits electrons;
an anode having an anode target facing the cathode in a direction along an X-ray tube axis, and in which a focal spot is formed where electrons emitted from the electron emission source collide to emit X-rays;
a cathode hood enclosing an orbit of electrons from the electron emission source to the focal spot and the anode target, and on which a first opening through which X-rays pass is formed;
a first X-ray transmission window blocking at least a part of the first opening and having an X-ray transmittance higher than an X-ray transmittance of the cathode hood;
an envelope housing the cathode, the anode target, the cathode hood, and the first X-ray transmission window; and a first restraining member, wherein the first X-ray transmission window has a first area facing the first opening, a frame-like second area enclosing the first area, and a first side surface overlapping an outer edge of the second area, the cathode hood has an inner circumferential surface enclosing the orbit of electrons and the anode target, an outer circumferential surface opposite the inner circumferential surface, a first hole opening on the outer circumferential surface and recessed toward the inner circumferential surface to house the first X-ray transmission window, a first bottom surface in the first hole, an inner wall surface in the first hole, a second hole continuous from the first hole, opening on the outer circumferential surface, and recessed toward the inner circumferential surface, and a second bottom surface in the second hole, the first opening is open on the inner circumferential surface and on the first bottom surface, respectively, the first bottom surface has a frame-like overlap space facing the second area of the first X-ray transmission window, the first side surface of the first X-ray transmission window faces the inner wall surface, the first restraining member faces the second area of the first X-ray transmission window, sandwiches the second area of the first X-ray transmission window together with the overlap space, and has a framed shape and a second side surface facing the inner wall surface, the first restraining member and the second bottom surface are welded together, and the first X-ray transmission window is maintained in a state of being restrained to the overlap space by the first restraining member fixed to the cathode hood.

4. The X-ray tube of claim 3, wherein a weld mark between the first restraining member and the second bottom surface is located on the inner circumferential surface side from a virtual extended surface of the outer circumferential surface.

* * * * *